United States Patent
Siganporia et al.

(10) Patent No.: US 9,444,711 B1
(45) Date of Patent: Sep. 13, 2016

(54) SYSTEM AND METHOD OF DETERMINING LATENCY

(71) Applicant: Google Inc., Mountain View, CA (US)

(72) Inventors: Aspi Siganporia, Saratoga, CA (US); Zhiheng Wang, Beijing (CN)

(73) Assignee: Google Inc., Mountain View, CA (US)

( * ) Notice: Subject to any disclaimer, the term of this patent is extended or adjusted under 35 U.S.C. 154(b) by 2 days.

(21) Appl. No.: 14/642,082

(22) Filed: Mar. 9, 2015

Related U.S. Application Data (63) Continuation of application No. 12/852,665, filed on Aug. 9, 2010, now Pat. No. 9,009,296.

(60) Provisional application No. 61/336,701, filed on Jan. 25, 2010, provisional application No. 61/273,712, filed on Aug. 7, 2009.

(51) Int. Cl.
  *G06F 15/16* (2006.01)
  *H04L 12/26* (2006.01)

(52) U.S. Cl.
  CPC .................. H04L 43/0864 (2013.01)

(58) Field of Classification Search
  CPC .................................... H04L 43/0864
  USPC .......................................... 709/224
  See application file for complete search history.

(56) References Cited

U.S. PATENT DOCUMENTS

| | | | |
|---|---|---|---|
| 5,708,780 A | 1/1998 | Levergood et al. | |
| 6,247,050 B1 | 6/2001 | Tso et al. | |
| 6,366,947 B1 | 4/2002 | Kavner | |
| 7,003,528 B2 | 2/2006 | Dan et al. | |
| 7,055,094 B2 | 5/2006 | Imielinski et al. | |
| 7,194,506 B1 | 3/2007 | White et al. | |
| 7,231,606 B2 | 6/2007 | Miller et al. | |
| 7,684,332 B2 | 3/2010 | Ray et al. | |
| 7,693,959 B2 | 4/2010 | Leighton et al. | |
| 7,937,470 B2 | 5/2011 | Curley et al. | |
| 8,140,646 B2 | 3/2012 | Mickens et al. | |
| 8,144,587 B2 | 3/2012 | Heinz et al. | |
| 8,176,186 B2 | 5/2012 | McCanne et al. | |
| 8,200,837 B1 | 6/2012 | Bhatti et al. | |

(Continued)

OTHER PUBLICATIONS

Krishnamurthy, Balachander et al. "On the Use and Performance of Content Distribution Networks," Proceedings 1st AXCM SIGCOMM Workshop on Internet Measurement, 2001, pp. 169-182.

(Continued)

*Primary Examiner* — Melvin H Pollack
(74) *Attorney, Agent, or Firm* — McDermott Will & Emery LLP (57) ABSTRACT

A web server monitors and receives measurements as to how long a client device takes to load or display individual items after a user first requests a web page containing the items. The measurements may be based on a duration that begins at a time between a user's navigation request and network browser's transmission of a request for a new web page. The recorded measurements received by the web server may include measurements relating to the latency experienced by the user in loading a particular item of content for a web page, such as an image, or may include the latency experienced by the user in loading an entire web page. One or more components used by the network browser, such as a network browser plug-in and or scripting language embedded in a web page, may provide one or more routines for measuring and reporting the latencies experienced by the user.

10 Claims, 5 Drawing Sheets

(56) References Cited

U.S. PATENT DOCUMENTS

| | | |
|---|---|---|
| 8,374,090 B2 | 2/2013 | Morrill et al. |
| 8,392,499 B2 | 3/2013 | Cherkasova et al. |
| 8,392,611 B2 | 3/2013 | Leighton et al. |
| 8,577,997 B2 | 11/2013 | Thomson et al. |
| 8,670,313 B2 | 3/2014 | Ray et al. |
| 8,723,701 B2 | 5/2014 | Fallon et al. |
| 8,756,341 B1 | 6/2014 | Richardson et al. |
| 2002/0032772 A1 | 3/2002 | Olstad et al. |
| 2002/0116491 A1 | 8/2002 | Boyd et al. |
| 2002/0152305 A1 | 10/2002 | Jackson et al. |
| 2004/0001476 A1 | 1/2004 | Islam et al. |
| 2004/0221034 A1 | 11/2004 | Kausik et al. |
| 2008/0052394 A1 | 2/2008 | Bugenhagen et al. |
| 2008/0052628 A1 | 2/2008 | Bugenhagen et al. |
| 2008/0228862 A1 | 9/2008 | Mackey |
| 2008/0281968 A1 | 11/2008 | Rodriguez |
| 2009/0274219 A1 | 11/2009 | Greene et al. |
| 2009/0292791 A1 | 11/2009 | Livshits et al. |
| 2010/0094967 A1 | 4/2010 | Zuckerman et al. |
| 2010/0269044 A1 | 10/2010 | Ivanyi et al. |
| 2012/0215640 A1 | 8/2012 | Ramer et al. |
| 2013/0254247 A1 | 9/2013 | Lisiecki et al. |

OTHER PUBLICATIONS

Nieh, Jason et al. "Measuring Thin-Client Performance Using Slow Motion Benchmarking," ACM Transactions on Computer Systems (TOGS), vol. 21, Issue 1, Feb. 2003, pp. 87-115.

Skadberg, Yongxia and Kimmel, James. "Visitors' Flow Experience While Browsing a Web Site: Its Measurement, Contributing Factors and Consequences," Computers in Human Behavior, vol. 20, Issue 3, 2004, pp. 403-422.

US Advisory Action issued Sep. 5, 2013 in U.S. Appl. No. 12/852,665.

US Notice of Allowance issued Dec. 15, 2014 in U.S. Appl. No. 12/852,665.

US Office Action issued Apr. 25, 2013 in U.S. Appl. No. 12/852,665.

US Office Action issued Aug. 9, 2012 in U.S. Appl. No. 12/852,665.

US Office Action issued Jul. 25, 2014 in U.S. Appl. No. 12/852,665.

```
<html>
  <head>
    <script type="text/javascript">
    var srt = window.external.pageT;
    var t0 = Date().getTime();
    var tran = window.external.tran;
    var record = {};

function tick(name) {
      record[name] = Date().getTime() - t0;
    } function report() {
      // send the following information to the server:
      // 1) srt & tran
      // 2) all the <name, value> pairs stored in record
    }
    </script>
  </head>

<body onload="tick('ol'); report();" >
    ...
    <img src="a.jpg" onload="tick('img');">
    ...
  </body>

</html>
```

FIGURE 5

SYSTEM AND METHOD OF DETERMINING LATENCY

CROSS-REFERENCE TO RELATED APPLICATIONS

The present application is a continuation, of U.S. patent application Ser. No. 12/852,665, filed Aug. 9, 2010, which also claims the benefit of priority to U.S. provisional application Ser. No. 61/273,712, filed Aug. 7, 2009, entitled "SYSTEM AND METHOD OF DETERMINING LATENCY," and U.S. provisional application Ser. No. 61/336,701, filed Jan. 25, 2010, entitled "SYSTEM AND METHOD OF DETERMINING LATENCY," the entire disclosures of which are hereby incorporated herein by reference.

BACKGROUND

Figure 1:
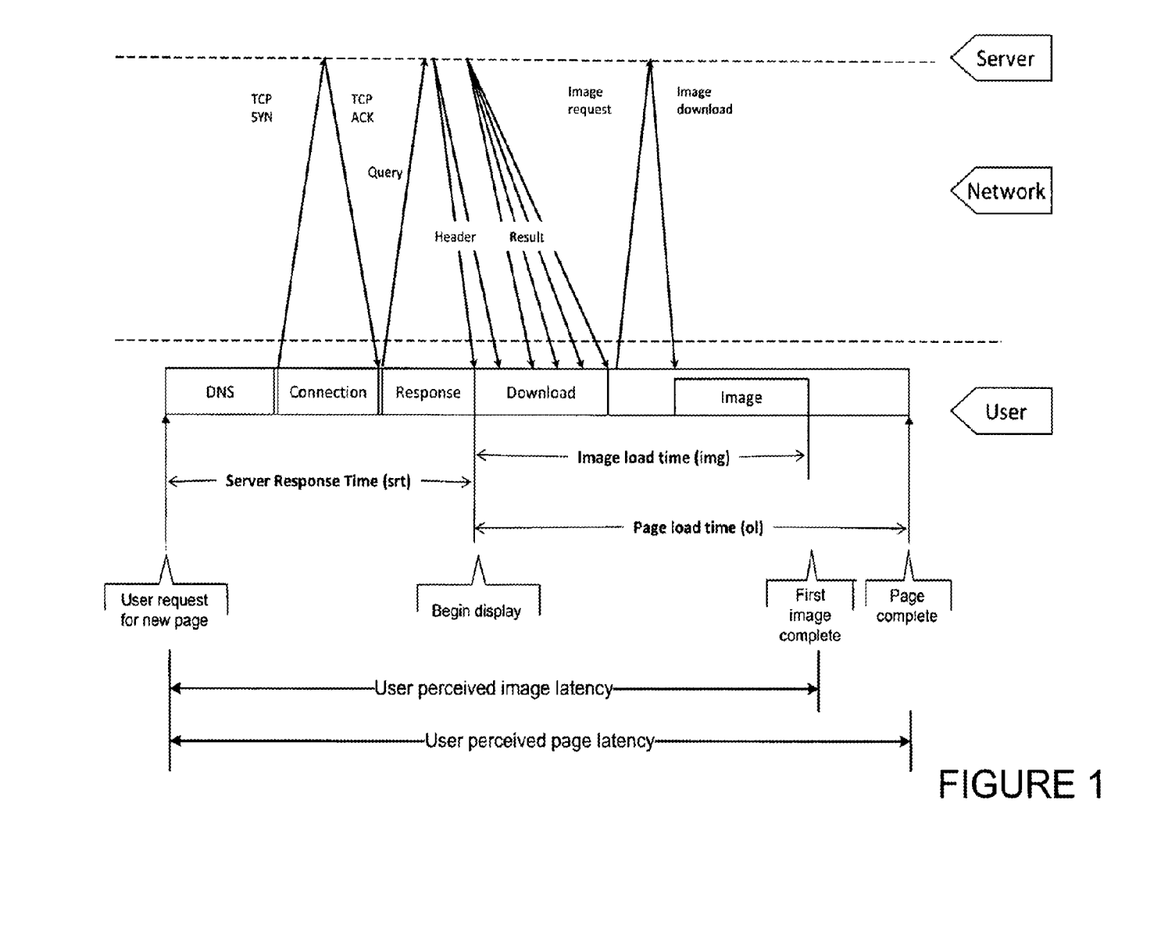
FIG. 1 is an illustration of one example of the types of delay a user may experience in requesting content from the web page.

When a user visits a web page, there is often a delay between the time a user requests for content from the web page and the time a network browser finishes displaying the content of the web page. FIG. 1 is an illustration of one example of the types of delay a user may experience in requesting content from the web page.

The process of requesting a web page may start with a user-based action, such as a user clicking a hyperlink anchored on one web page that targets a web page at another website. The request for a new web page may also be automatically generated by the network browser itself or some other program executing on the client device.

A first delay may result from consulting a Domain Name System ("DNS") server to obtain an Internet Protocol ("IP") address of a target based on a Uniform Resource Locator ("URL") identified by a hyperlink. More delay may result as the network browser of the client device tries to establish a connection with a target server in accordance with one or more network protocols, such as the network protocols found in the Internet Protocol Suite. The network itself may introduce its own latency, e.g., the network may be bandwidth limited and information carried by the network may be transmitted through a large number of intervening nodes between the client device and the target server.

After a connection is established, the server may take time to determine the proper response to the request from the network browser; particularly if the web page is dynamically created. For example, the transition to a new web page may result from a user using the network browser to transmit a search request (e.g., the user typed text onto a web page and clicked a search button, which caused the network browser to transmit the search request as a parameter appended to the URL of a different web page).

After the server determines the proper response, the server may begin transmitting the web page and the network browser may start changing the display in response to receiving the web page. For ease of explanation, "server response time" shall refer to the duration between the time of the client device's request for a new web page and the time at which the client device first starts receiving the web page. The server may start by sending information that can be quickly downloaded and displayed, such as the header of a Hypertext Markup Language ("HTML") document and text-based search results. The network browser may provide some visual indication as soon as the initial information for the web page is received, such as displaying a background color in the main window in lieu of the prior web page.

Depending on the content and structure of the web page, the network browser may thereafter start requesting web page content, such as images displayed as part of the web page. For example, the server may have transmitted the network locations of images to be displayed, which the network browser may request after other information in the web page is received. The images may accordingly be requested by the client device, and the server providing the images may process the request and send an image in response. The client device may also take time to download the image.

For ease of explanation, "image load time" shall refer to the duration between the time of the initial receipt of the web page and the time that the image has finished loading. A network browser typically displays the entire image (assuming it is positioned within the main window of the network browser) as soon as the download of the image is complete—even if the network browser is to download more images. Depending on the structure of the web page and image, portions of the image may be displayed as the image data is received. Accordingly, a single web page may have multiple image load times if the web page contains multiple images.

It will be understood that other components of a web page may also take time to display, such as videos, audio, and content that is dynamically loaded and changeable. One example of dynamically loaded and changeable content are components implemented in Asynchronous JavaScript and Extensible Markup Language ("AJAX") web pages.

At some point, all of the information associated with the web page is downloaded. For ease of explanation, "web page load time" refers to the duration between the initial receipt of the web page and the time at which all of the information on the web page has been loaded. Many network browsers may prevent a user from fully interacting with the individual content of a web page until the web page is completely loaded.

A user may perceive latency as three or more different durations: the time the user must wait for the web page to begin loading (e.g., server response time) after the user has requested the web page, the time it takes for images to finish loading after the user has requested the web page (shown in the figure as user perceived image latency, which equals server response time plus the image load time), and the time it takes for the entire web page to finish loading after the user has requested the web page. As noted above, there may be a delay in rendering other individual content on a web page as well. If the latency is too long, a user may become frustrated with the services provided by the website.

SUMMARY

One aspect of the system in accordance with the present disclosure assists a web server in learning how long a client device takes to load or display individual items after a user first requests a web page containing the items. In one aspect, how long a client device takes to load or display individual items after the users first requests the web page containing the items reflects a duration that begins at a time between the user's navigation request, such as clicking a hyperlink, and the network browser's transmission of the request for a new web page, such as the time it takes for the client device to actually process and transmit the request.

The duration may end when the individual content reaches a state of completion. The system may allow the operator or server of the web page to define both the individual content that will be measured and the criteria for completion. For example, the operator may choose to measure the latency associated with an individual image on a web page and define completion as time at which the image has finished loading.

In still another aspect, the system may be implemented in accordance with instructions, where (1) some of the instructions are accessible by, and called by, the processor of the client device regardless of the HTML document that was loaded (such as the native routines of a network browser and the routines of a network browser plug-in), and (2) some of the instructions are resident in the HTML document that is going to be measured, such as in JavaScript and HTML tags. The instructions resident in the HTML document may identify the individual content items to be measured, as well as perform other functions.

BRIEF DESCRIPTION OF THE DRAWINGS

FIG. 3 illustrates one example of logic flow for implementing various functions and data for a network browser plug-in.

DETAILED DESCRIPTION

Figure 2:
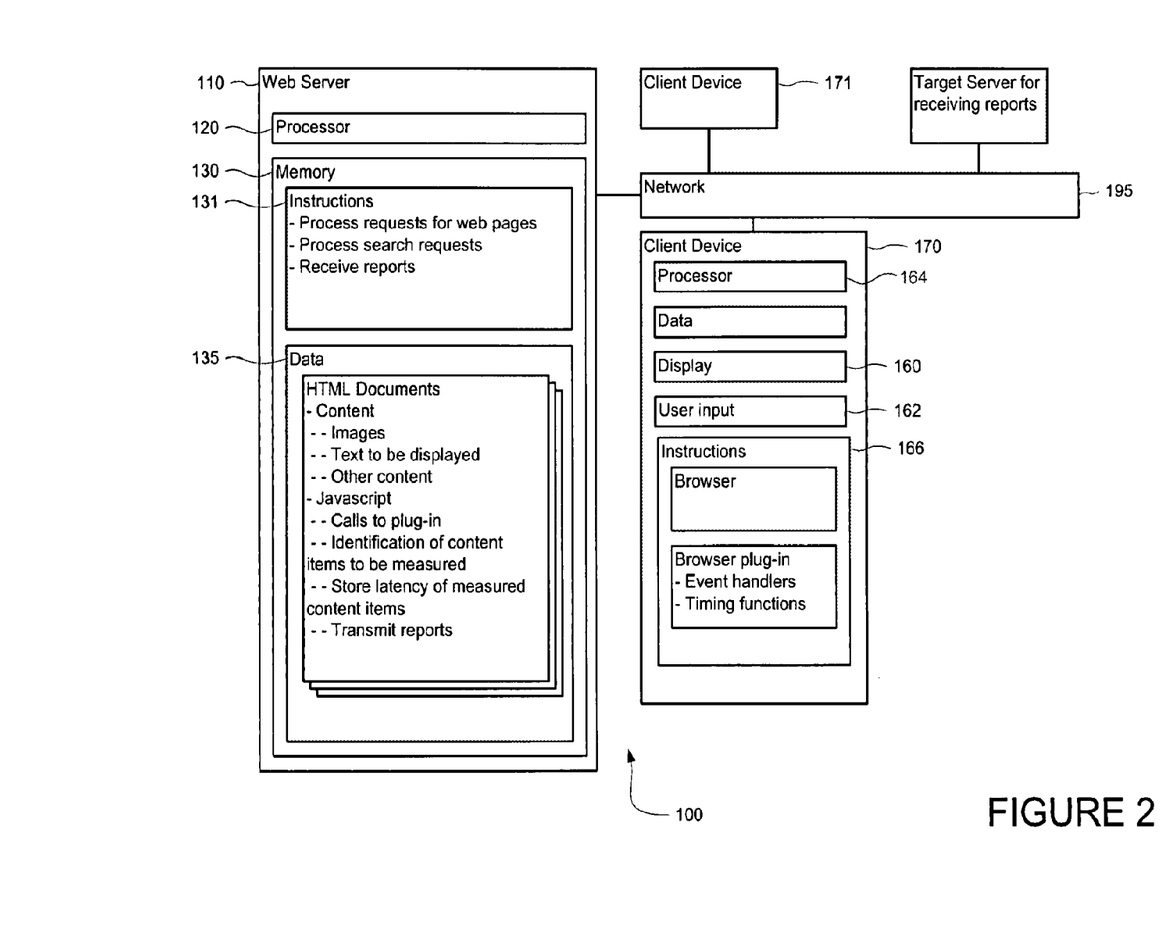
FIG. 2 illustrates one example of a system in accordance with one aspect of the disclosure.

FIG. 2 illustrates one example of a system 100 in accordance with one aspect of the disclosure. As shown in FIG. 2, the system 100 includes a computer 110 containing a processor 120, memory 130 and other components.

The memory 130 may store information accessible by the processor 120, including the instructions 131 that may be executed by the processor 120 and data 135. The memory 130 may be of any type of memory capable of storing information accessible by the processor 120, including a computer-readable medium, or other medium that stores data that may be read with the aid of an electronic device, such as a hard-drive, memory card, Read-Only Memory ("ROM"), Random-Access Memory ("RAM"), a Digital Video Disc ("DVD"), other optical disks, as well as any other write-capable and read-only memories now known or later developed. The system 100 and method may include different combinations of the foregoing, whereby different portions of the instructions and data are stored on different types of media.

The instructions 131 may be any set of instructions to be executed directly (such as machine code) or indirectly (such as scripts) by the processor 120. For example, the instructions 131 may be stored as computer code on the computer-readable medium. In that regard, the terms "instructions" and "programs" may be used interchangeably herein. The instructions 131 may be stored in object code format for direct processing by the processor 120, or in any other computer language including scripts or collections of independent source code modules that are interpreted on demand or compiled in advance. Functions, methods and routines of the instructions 131 are explained in more detail below.

Data 135 may be retrieved, stored or modified by processor 120 in accordance with the instructions 131. For instance, although the system 100 and method is not limited by any particular data structure, the data may be stored in computer registers, in a relational database as a table having a plurality of different fields and records, Extensible Markup Language ("XML") documents or flat files. The data may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., a bitmap file format such as "BMP") or lossy (e.g., a "JPEG" file format), and bitmap or vector-based (e.g., an "SVG" file format), as well as computer instructions for drawing graphics. The data 135 may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any well-known processor, such as processors from Intel Corporation or from Advanced Micro Devices, Inc. ("AMD"). Alternatively, the processor 120 may be a dedicated controller such as an application-specific integrated circuit ("ASIC") or any other circuit now known or later developed. Although FIG. 2 functionally illustrates the processor 120 and memory 130 as being within the same block, it will be understood by those of ordinary skill in the art that the processor 120 and the memory 130 may actually comprise multiple processors and memories that may or may not be stored within the same physical housing. Accordingly, references to a processor or a computer will be understood to include references to a collection of processors or computers or memories that may or may not operate in parallel.

The computer 110 may be at one node of a network 195 and may directly and/or indirectly communicate with other nodes of the network 195. For example, the computer 110 may comprise a web server that is capable of communicating with client devices 170-171 via the network 195 such that the server 110 uses the network 195 to transmit and display information to a user on a display 160 of a client device 170. The server 110 may also comprise a plurality of computers that exchange information with different nodes of a network for the purpose of receiving, processing and transmitting data to the client devices 170-171; in this instance, the client devices 170-171 may be at different nodes of the network than any of the computers comprising server 110.

The network 195, and one or more intervening nodes between server 110 and client devices 170-171, may comprise various configurations and use various networking technologies including the Internet, World Wide Web, intranets, virtual private networks, local Ethernet networks, private networks using communication protocols proprietary to one or more companies, cellular and wireless networks (e.g., WiFi), instant messaging, Hypertext Transfer Protocol ("HTTP") and Simple Mail Transfer Protocol ("SMTP"), and various combinations of the foregoing. Although a few computers are depicted in FIG. 2, it should be appreciated that a typical system may include a large number of connected computers.

Each client device 170-171 may be configured similarly to the server 110, with a processor 164, memory and instructions 166. Each client device 170-71 may be a personal computer intended for use by a person, and have all of the components normally used in connection with a personal computer such as a central processing unit (CPU) 164, memory (e.g., RAM and internal hard drives) storing data and instructions 166, an electronic display 160 (e.g., a monitor having a screen, a small LCD touch-screen, a projector, a television, a computer printer or any other electrical device that is operable to display information), user input 162 (e.g., a mouse, keyboard, touch-screen or microphone), camera 163, speakers, a network interface device, and all of the components used for connecting these elements to one another.

Although the client devices 170-71 may comprise a full-sized personal computer, the system 100 and method may also be used in connection with mobile devices capable of wirelessly exchanging data with a server over a network such as the Internet. By way of example only, the client device 171 may be a wireless-enabled personal display assistant ("PDA") or a cellular phone capable of obtaining information via the Internet. The user may input information using a small keyboard (in the case of a mobile device), a keypad (in the case of a typical cell phone) or a touch screen (in the case of a PDA). Indeed, computers in accordance with the systems and methods described herein may comprise any device capable of processing instructions and transmitting data to and from humans and other computers including general purpose computers, network computers lacking local storage capability, and set-top boxes for televisions.

Although certain advantages are obtained when information is transmitted or received as noted above, other aspects of the system 100 and method are not limited to any particular manner of transmission of information. For example, in some aspects, information may be sent via a medium such as an optical disk or portable drive. In other aspects, the information may be transmitted in a non-electronic format and manually entered into the system 100. Yet further, although some functions are indicated as taking place on a server and others on a client, various aspects of the system 100 and method may be implemented by a single computer having a single processor.

A network browser may make available one or more routines for use by other programs. For instance, network browsers such as Internet Explorer, available from Microsoft Corporation, and Chrome, available from Google Inc., raise a variety of events that may be captured by other programs. Events that may be captured by other programs may be considered "public" events and may be distinguished from "private" events. These network browsers may make one or more routines public, i.e., usable by other software programs provided by third parties.

Third parties may develop programs that capture the events and call the routines of the network browser. By way of example, third party software is available that extends Internet Explorer's functionality by providing additional routines and functions that interact with the native routines of Internet Explorer.

For ease of illustration and not limitation, the collection of instructions that are intended to interact with a network browser, as well as the data generated by a processor when executing such instructions, shall be referred to herein as a "network browser plug-in". The Google Toolbar for Internet Explorer and the Google Toolbar for Firefox, both available from Google Inc., are just two examples of such network browser plug-ins.

Figure 3:
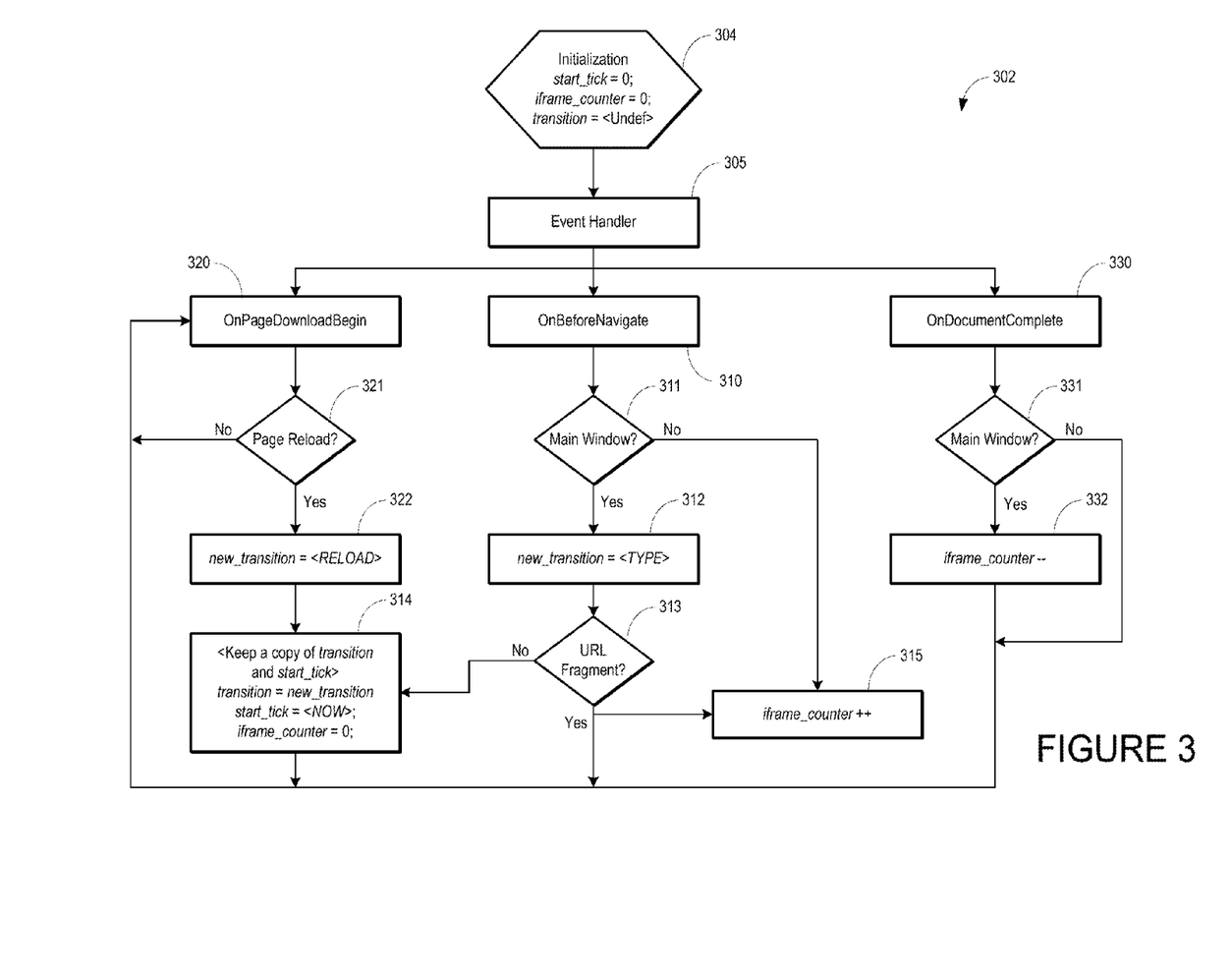

FIG. 3 illustrates one example of logic flow 302 for implementing various functions and data for a network browser plug-in. Additional functionalities of the exemplary network browser plug-in are described in the Web Timing Application Programming Interface ("API"), published Aug. 7, 2009, available from http://dev.w3.org/cvsweb/~check-out~/2006/webapi/WebTiming/Over view.html?rev=1.25&content-type=text/html; %20charset=iso-8859-1, which is incorporated by reference herein in its entirety; the Web Timing API, published Jan. 19, 2010, available from http://dev.w3.org/cvsweb/~checkout~/2006/webapi/WebTiming/Over view.html?rev=1.3&content-type=text/html; %20charset=iso-8859-1, which is incorporated by reference herein in its entirety; and the Web Timing API, published Jul. 25, 2010, available from http://dev.w3.org/2006/webapi/WebTiming, which is incorporated by reference herein in its entirety (collectively referred to as the "Web Timing APIs").

One of the items of data processed by the network browser plug-in may be indicative of a duration of time. By way of example, the variable "start_tick" (Block 304) may store the number of milliseconds (or any other measurement of time) that have passed between two events. Where the "start_tick" variable is initially set to zero, an error may be generated when the "start_tick" variable indicates a duration of zero when a non-zero duration was expected.

Another item of data maintained by the network browser plug-in may indicate whether the network browser is using different windows to display information. For instance, the web server 110 may instruct the network browser (e.g., via an HTML document) to open new frames or inline frames ("iframes") within its window and obtain the content (e.g., advertisements) for the frames or iframes from other locations (e.g., servers providing third party advertisements). The variable "iframe_counter" (Block 304) may therefore be used to store the number of frames or iframes that are currently being displayed by the network browser beyond the main window.

Yet another item of data maintained by the network browser plug-in may relate to the type of action that resulted in the network browser window transitioning from the display of one document (or no document) to another document. In that regard, the variable "transition" (Block 304) may store an identifier of the action, such as whether a new web page was loaded as a result of a user clicking a hyperlink, typing in a keyword that caused the network browser to navigate to a new web page, receiving a reload command, or any other type of action that has occurred using the network browser. Where the "transition" variable is initially set to an undefined transition, an error may be generated when a transition was expected but the transition remains undefined.

FIG. 3 further illustrates network browser plug-in functions that may be executed by the processor 164 in response to three different events generated by a network browser. Additional functions and events are further described in the Web Timing APIs.

In one implementation, the system 100 may capture information that exists at the time of a navigation request and prior to loading a document that is the target of the request. For example, the network browser Internet Explorer may signal the occurrence of (i.e., "fire") the "OnBeforeNavigate" event before the main window or a frame of the network browser navigates to another target (Block 310). As shown in FIG. 3, the network browser plug-in may capture the event by overriding the "OnBeforeNavigate" routine 310 of the network browser (the routine used by the network browser to fire the event) or otherwise listening for the event.

After the system 100 determines that navigation is about to occur, the system 100 may determine whether the navigation occurred within the network browser's main window or a frame (Block 311). When a network browser, such as Internet Explorer, fires the event, the network browser plug-in may determine the type of object (e.g., main window or frame) that is about to navigate.

Where the navigation occurs in the main window, the system 100 may store data indicative of the action that caused the navigation. For example, the network browser plug-in may update the value stored by the "transition" variable. Alternatively, the network browser plug-in may update the value of a temporary transition variable, such as the "new_transition" variable (Block 312).

The system 100 may also determine whether the network browser is actually loading a new web page. When used in connection with a network browser, such as Internet Explorer, the network browser plug-in may determine whether the current location and the target location are URLs and, if so, whether the current and target URLs differ. The network browser plug-in may use any criteria to determine whether the current and target URLs differ, such as by analyzing the text occurring after a URL fragment identifier (Block 313). Where the difference in the current and target URLs is in the URL fragment, the network browser plug-in may assume that a new web page has not been loaded. For example, navigating from from a first URL "www.google.com/abc" to a second URL "www.google.com/def" may be considered navigation from one web web page to another web page, whereas navigating from a third URL "www.google.com/abc#1" to a fourth URL "www.google.com/abc#2" may not be considered navigation from one web page to another web page.

Where the system 100 determines that the network browser is starting a new navigation, the system 100 may store a record of the current time. For example, the network browser plug-in may update the "start_tick" variable to store the current time (Block 314). Alternatively, the network browser plug-in may store or copy the values of the "start_tick" variable and the "transition" variable prior to updating the values of the "start_tick" variable and/or the "transition" variable. The network browser plug-in may provide the stored or copied values of the "start_tick" variable or the "transition" variable to one or more subsequently visited web pages.

There may be a short delay between the action that caused the navigation and the updating of the "start_tick" variable due to the execution of the relevant routines of the network browser, the network browser plug-in and other potential demands on the processor. However, the time stamp value stored in the "start_tick" variable may still be indicative of the time of the request to load a new web page.

Where the network browser plug-in determines that a new web page is being loaded, the network browser plug-in may also reset the "iframe_counter" variable to zero since the network browser may close the frames when the network browser's main window navigates to a new web page.

After the network browser plug-in stores the time of the action that caused the navigation to a new web page, the network browser plug-in may return to listening for other events or wait for further calls to its routines.

Where the navigation occurs within a frame, the system 100 may increment the data indicative of the number of frames (Block 315). As one example, the network browser Internet Explorer may fire the "OnBeforeNavigate" event each time a frame or iframe is created and loaded with content from the frame's or iframe's target location. In one aspect, the system 100 does not store data indicative navigation within a frame or iframe, because such data may be confused with the data desired by the users of the system 100. Similarly, where the difference between the current URL and the target URL is in a URL fragment, the network browser plug-in may forego storing the time of the request for a new web page.

Alternatively, the system 100 may provide timing information at various levels of a webpage or at various moments during the loading and/or interaction with a web page. For example, where the web page defines one or more frame elements or iframe elements, the system may provide timing information for each frame or iframe element. As a network browser may provide one or more events to the web page in which the frame element or iframe element is embedded, so too may the system 100 determine timing information within the frame element or iframe element.

The system 100 may also store certain information at a time just prior to the network browser's reloading of a web web page. For example, the network browser Internet Explorer may call the "OnPageDownloadBegin" method each time it reloads the current a web page (Block 320). Accordingly, the network browser plug-in may review the parameters passed to the "OnPageDownloadBegin" method to determine whether the web page is, in fact, being reloaded (Block 321). The network browser plug-in may also use the "iframe_counter" variable to determine whether the main window is being reloaded (e.g., it may determine whether "iframe_counter" variable is greater than a predetermined value, such as "0"). If so, the "transition" variable, or a temporary transition variable (e.g., the "new_transition" variable), may be updated to identify the transition as a reload—compared to navigation to a different location— based on the selection of a hyperlink or the like (Block 322). The network browser plug-in may also update one or more variable, such as the "start_tick" variable, the "transition" variable, the "new_transition" variable, and/or the "iframe_counter" variable as indicated above (Block 314).

The system 100 may rely on other events as well. For instance, a network browser such as Internet Explorer may call an "OnDocumentComplete" event and/or method when the network browser considers the document to have reached a state of completion (Block 330). In one implementation, the network browser may fire the "OnDocumentComplete" event after it has downloaded and constructed an HTML document, and the network browser is ready to allow the user to interact with the HTML document. Where the system 100 determines that the "OnDocumentComplete" event fired in a frame, the system 100 may decrement the "iframe_counter" variable by a predetermined amount (Blocks 331-332).

In one aspect of the system 100, the instructions of the event handlers described in connection with FIG. 3 may execute without regard to the information that is specific to the new web page. The network browser plug-in may, however, provide routines that are typically called by instructions provided on a loaded web page.

In another aspect of the system, the network browser plug-in may store or keep one or more timing information for one or more previously visited web pages. Where the timing information for the previously visited web pages is stored or kept, a web page that is currently being visited may be able to obtain the timing information for the previously visited web pages.

One example of an action that may involve using previously stored timing information for previously visited web pages is a redirection action. In this example, during the redirection action, a destination web page may refer or use the timing information of a previously visited web page, which may be stored or kept by the network browser plug-in. By using the timing information of the previously visited web page, the destination web page may calculate the latency starting from the beginning of the redirecting web page, which, in turn, reflects the actual user experience. Other actions that involve using the timing information for previously visited web pages are also possible.

In one aspect of the disclosure, the network browser plug-in may provide a routine that returns the amount of time that has elapsed since the network browser received (or caused) the request to navigate to a new web page. Alternatively, the network browser plug-in may record various measurements of time in one or more variables, such as a using a timestamp based on Coordinated Universal Time (UTC), to determine the amount of time that has elapsed. Other techniques for measuring time are also possible as well.

Figure 4:
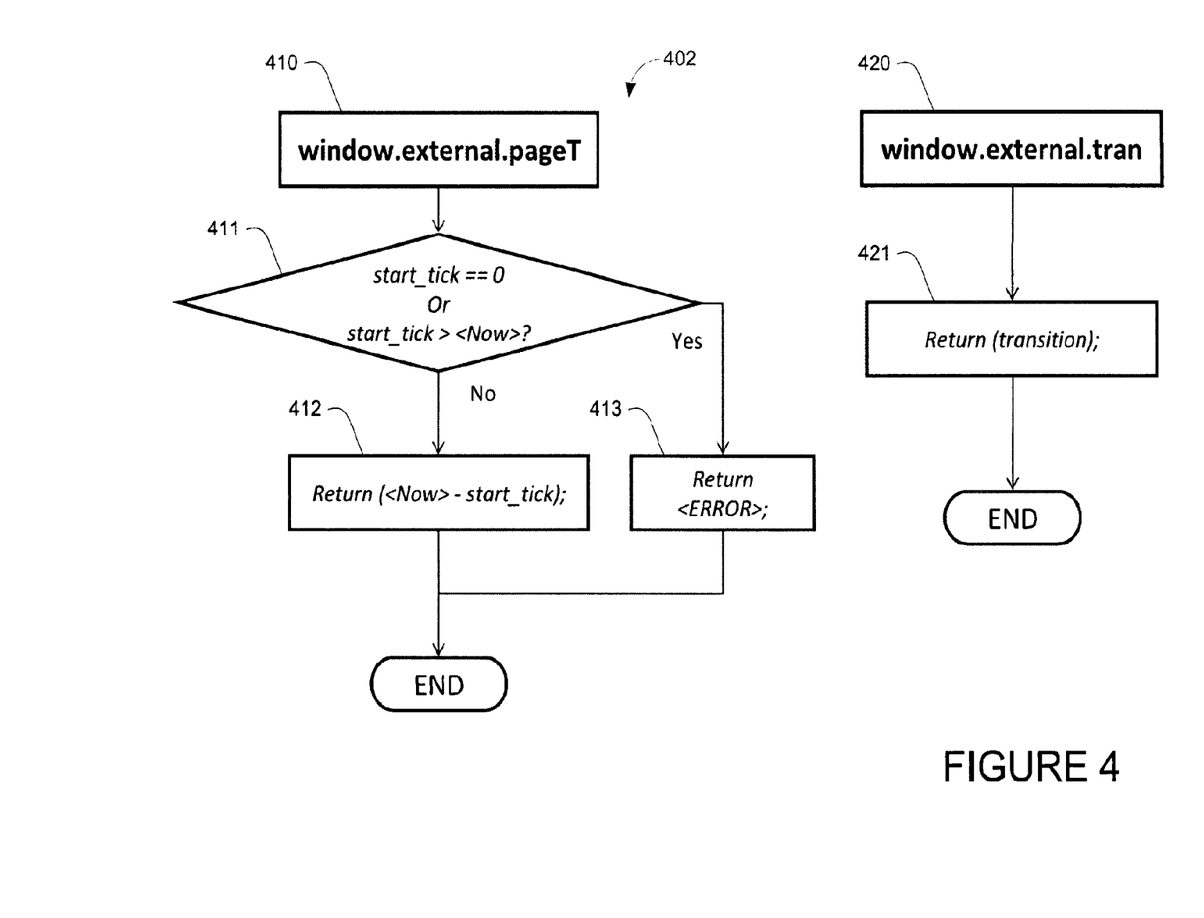
FIG. 4 illustrates one example of logic flow for implementing a routine that returns the amount of time that has elapsed since a network browser has received a request to navigate to a new web page.

FIG. 4 illustrates one example of logic flow 402 for implementing a routine that returns the amount of time that has elapsed since the network browser received the request to navigate to a new web page. As shown in FIG. 4, when a routine "Window.External.PageT" (Block 410) is called, the routine may return the difference between the then-current time and the value of the "start_tick" variable (Block 412). The "Window.External.PageT" routine may also perform error checking, such as determining whether the "start_tick" variable was never set or whether the "start_tick" variable value is set for the future, and return an error if an error is found (Block 411 and Block 413.)

The network browser plug-in may also provide a routine that returns the type of user action, or other action, that resulted in the network browser window transitioning from one document to another. In that regard, FIG. 4 illustrates one exemplary routine, "Window.External.Tran" that returns the value of the transition variable (Block 420 and Block 421).

Figure 5:
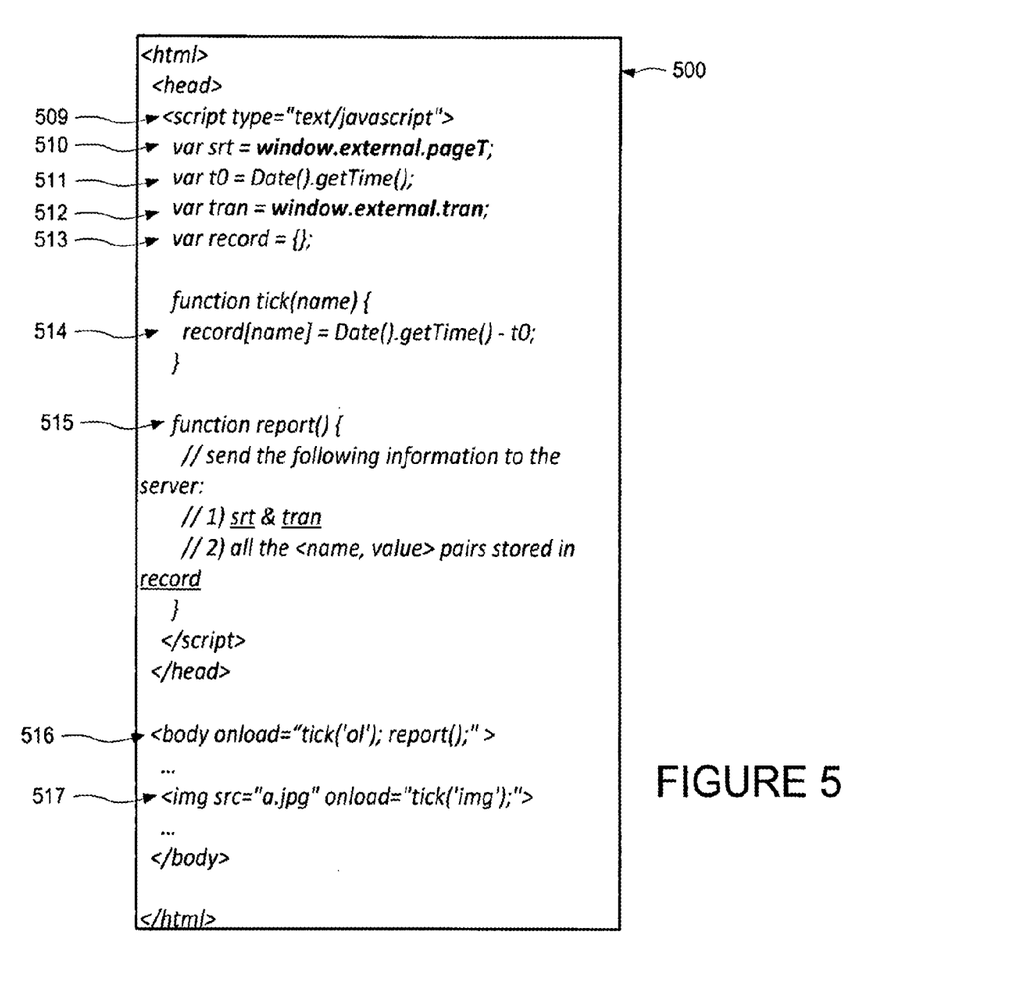
FIG. 5 illustrates one example of a portion of a web page that references one or more routines to measure the latency of individual items on a web page.

Referring next to FIG. 5 is one example a portion of a web page 500 that references one or more routines to measure the latency of individual items on a web page. The web page 500 may also use any one of the attributes and/or routines defined in the Web Timing APIs to provide further measurements of latency for individual items of a web page.

The web page 500 may invoke one or more scripting languages in implementing one or more routines of the Web Timing APIs. For example, and as noted at line 509, the web page 500 may invoke JavaScript to process and store data. However, the web page 500 may also invoke other scripting languages, such as Active Server Pages ("ASP"), for implementing one or more of the routines.

The web page 500 may include one or more instructions to store information indicative of server response time. For example, the processor 120 and/or the processor 164 may define a variable "srt" (line 510) to execute one or more instructions of the web page 500. In the implementation depicted in FIG. 5, when the scripting instructions are executed, the processor 120 and/or the processor 164 invokes the "Window.External.PageT" routine (as discussed above) of the network browser plug-in (line 510).

The "Window.External.PageT" routine may be invoked in any location of the web page 500. Where the invoking of the "Window.External.PageT" routine is located at the beginning of the web page 500, such that the function is called as soon as possible after the web page 500 is first received, the "Window.External.PageT" routine function may return a value indicative of the server response time. For example, if the variable "srt" is assigned in the header of the web page 500, the value of the variable "srt" may be determined before the content contained in the body of the HTML document corresponding to the web page 500 is loaded.

The system 100 may also store a value indicative of the time at which the web 500 page began executing. For instance, by defining a variable "t0" (line 511) at the beginning of the web page 500 and storing the then-current time in the variable "t0", the variable "t0" may be subsequently used to calculate other durations. However, the variable "t0" may be defined at point in the web page 500 or at any time when the page 500 is loading.

Another measurement recorded by the system 100 includes the type of action that resulted in the current web page being loaded. The current web page being loaded may be the web page 500 or any other web page. As shown at line 412, a variable "tran" may store the value returned by the Window.External.Tran function (discussed above with reference to FIG. 4) of the network browser plug-in.

The web page 500 may identify those items for which the system is to record latency measurements. In one aspect, the latency is measured with respect to the time at which the web page 500 was first requested by the network browser. By way of example and as shown at line 516, the web page 500 indicates that the individual image "a.jpg" (line 517) should be measured. To invoke a measurement of the latency for the individual image "a.jpg," the web page 500 may include a function call in the HTML tag of the individual image. The web page 500 may also include function calls in the HTML tags of other types of items as well.

In one implementation, the system 100 may determine the latency of the identified items when the items satisfy a completion criteria. By way of example and as shown at line 517, the completion criteria for the image "a.jpg" occurs when the "OnLoad" JavaScript event fires. The "OnLoad" event for an image is intended to fire as soon possible after the network browser has finished loading the image. In general, a network browser may display an image in its entirety after the entire image has finished loading (though portions may be shown earlier). In that regard, the intended completion criteria may comprise the display of an image after it has finished loading. However, other completion criteria are also possible.

When the completion criteria are met, the system 100 may store information relating to the extent of the latency. As shown at line 517, the HTML document defined a "tick" function as an event handler for the "OnLoad" event. When the "OnLoad" event fires for the image "a.jpg", the processor 120 and/or the processor 164 may pass an identifier for the image ("img") to the instructions of the "tick" function.

As indicated at line 514, the "tick" function associates the identifier with a value indicative of latency, such as the difference between the current time and the variable "t0". As a result, the client device 170 or client device 171 may store a record that associates an identifier of the image with a time value, where the time value is based on how long the client device 170 or the client device 171 takes to load and display the image after the client device 170 or the client device 171 first loaded (or started loading) the web page 500.

In other words and in one aspect, the durations stored for the individual items are measured relative to the loading of the web page 500, which may begin at the end of the period of time associated with the server response time.

The amount of time spent in loading the entire web page 500 may also be determined and stored. As shown at line 516, the "OnLoad" event for the entire body of the web page may also be passed to the event handler.

In addition to recording various latency measurements, the web page 500 may also identify when the stored durations and latency measurements are transmitted to another computer for use. As shown at line 516, the processor 164 of the client device 170 may invoke a reporting function after the entire web page 500 has been loaded. The reporting function is defined as the function "report" at line 515 of the web page 500. The "report" function, in turn, may provide the timing data, including the durations and latency measurements, to a target location.

In one aspect, after the web page 500 is loaded, the "report" function sends all collected information to the server 110 asynchronously by an HTTP command call, such as the HTTP "GET" command. In that regard, the client device 170 or the client device 171 may create a dynamic image Document Object Model ("DOM") object, whose requesting location may contain the reported information. The client device 170 (or the client device 171) may also transmit the reported information asynchronously by another HTTP command call, such as the HTTP "POST" command, by creating an iframe DOM object, whose source location contains the reported information. Other mechanisms and/or other HTTP command calls may also be implemented for transmitting the reported information.

In addition to transmitting the latencies associated with individual items on the web page 500, the system 100 may also transmit one or more values for one or more variables defined by the web page 500. For example, the system 100 may transmit a response time value indicative of the server response time (e.g., the value of variable "srt"), the type of transition (e.g., the value of variable "tran"), or any other value defined by the web page 500.

The target location of the reported information may be defined in various ways. In one aspect, the system 100 may automatically send reported information to a server that provided the web page 500. In another aspect, the system 100 may automatically send reported information to a destination defined by the network browser plug-in, the network browser, the user of the network browser, or any combinations thereof. In still another aspect, the system 100 may send reported information to a destination defined in the web page 500. Yet further, the reported information may be sent to combinations of the foregoing and still other locations.

By receiving the server response time, the individual latencies of individual items on the web page 500, and/or the latency of the entire web page, the recipient of the reported information may calculate the perception of item latency, such as image latency, for the user of the network browser, as well as the user's perception of web page latency.

There may be differences in measured latency depending on whether the latency analysis is performed by the server 110 or by the client devices 170-171. For example, a server-side analysis that measures latency based on the time a request is received and the time responsive data is sent may find a low latency. In contrast, a client-side analysis that measures latency based on the time a request is sent and the time a response is received may find a high latency. In other words, latency measured by the server 110 may be lower than latency measured by the client devices 170-171. Accordingly, in at least one aspect, the system 100 may provide the operator of the server 110, or the server 110 itself, with more accurate information regarding what the user is experiencing.

The server 110 and/or its operator may take various steps in response to receiving the foregoing latency data from the client device 170 or the client device 171. By way of example, where a particular type of content is shown to incur longer latency on one or more network browsers, a different form of content may be served to those affected network browsers. For example, the network browser Internet Explorer may receive a different form of content than the network browser Chrome for the same web page. Moreover, where the server 110 is providing advertisement-supported search results, the operator or the server 110 may provide the advertisers with information regarding the latency experienced by the network browsers when the network browsers rendered the advertisement. The nature of the advertisement may be changed in response to the experienced latency.

Still further, and depending on the type of content and extent to which the network browser permits interaction with a web page before it finishes loading, the system 100 may be used to determine when users start interacting with the web page. For example, an operator of the server 110 or the server 110 itself may assume that a user is likely to consider a web page of interactive items to be complete as soon as a few of many items are displayed. However, the system 100 may determine that most users actually start interacting with the web page as soon as a first item is displayed, or alternatively that most users do not interact with the web page until the network browser indicates that the entire web page has finished loading. By determining when a user begins interacting with a web page, the server 110 may decide how to serve items, such as search results, to a network browser.

Indeed, the system 100 may be used to determine whether the server 110 can afford to spend additional time to construct a response without negatively impacting the user's experience or increasing the overall end-to-end time. In that regard, an advertisement-supported search service may determine that the server 110 can budget a predetermined amount of time, such as 100 milliseconds or any other measurement of time, to improve the quality of the selected search results or select advertisements may suited for the user of the network browser.

The system 100 may also take the size and complexity of the content into account when determining latency. The size and complexity of the content for a web page content may have a serious impact on latency experienced by a user. For example, more complex content, such as audiovisual content, may increase the amount of latency experienced by the user whereas less complex content, such as textual content, may decrease the amount of latency experienced by the user.

Where changes are made to improve latency, the system 100 may also confirm whether the changes impacted the latency experienced by the user. The system 100 may determine whether the changes had a substantial impact or whether the changes had a negligible impact on the latency experienced by the user. In some instances, decreases in latency that may be measured at the server 110 may not materialize on the client devices 170-171. For example, server side techniques, such as caching, may provide relatively little benefit where a "last mile" latency dominates the overall latency experienced by the end user. A "last mile" latency is a latency that materializes between the network browser of the user and the preceding node that transmitted the web page content to the user. A "last mile" latency is common in many developing countries.

In addition, the system 100 may assist service providers in testing various latency-reduction techniques, such as placing an edge server or front-end cluster closer to the user, or instituting changes completely internal to the server 110. The various latency-reduction techniques may mitigate the likelihood that the service provider incorrectly assumes that a particular technique has reduced the latency experienced by a user.

Moreover, the system 100 may employ a transaction tag to identify a particular transaction and the latency experienced during the particular transaction. In one implementation, the client device 170 (or the client device 171) and/or the web page 500 may use a transaction tag to identify a set of client side processes as a set of requests belonging to the same transaction. In using a transaction tag, the measurements, such as the durations and measured latencies, received on the server side may be grouped together and related with other server side measurements, which may also have the same transaction tag. When a new transaction starts on the client side, a new transaction tag may be generated. The transaction tag may be passed along with the other latency measurements sent to the server 110. On the server side, the transaction tag may be matched with other server side measurements to create a complete scenario of how different components interacted and the response times for the transaction as a whole. Where the client device 170 (or the client device 171) and/or the web page 500 opts to forego the use of a transaction tag, the server 110 may process each latency measurement associated with a request measurement in an isolated manner, which may be less indicative of the user experience.

The reported information may also be used to determine how latency affects users' interest in content, such as whether more or less users evidence an interest in advertisements in response to increased or decreased latency. For example, a user may not recognize a minute difference in latency, such as 50 milliseconds. Regardless, it may be possible that smaller or somewhat larger differences in latency impact a user's interest in content even if the user is not aware of the difference itself. The operator of a web page or the server of a web page may decide to balance the expected benefits of spending additional time to select the better suited content for the user against the expected detriments of delaying the user's receipt of content. As a result, the operator or the server 110 may provide web page content with increased latency to one randomly selected group of users and the same content with decreased latency to another randomly selected group of users, compare the latency results and the user selection results, and determine whether the latency is impacting the user's interest in the content. The system 100 may be particularly effective in this analysis as it provides a more direct measurement of the latency experienced by a user than typical server-side only measurements.

Moreover, where the network browser or the network browser plug-in is configured to provide DNS time as well as the DNS resolver, benefits may result from associating a client subnet with the actual DNS resolver being used. In other systems, the server 110 may not be able to determine which client IP address used a particular DNS resolver. There are often benefits for server load balancing algorithms having accurate mapping, and heuristics may be employed to obtain this mapping. In that regard, a server may use this information where it is provided by a network browser plug-in or a network browser as described herein.

Yet further, the server 110 may automatically perform a statistical analysis of the reported information as it arrives, and the server 110 may transmit a visual or audible alert when the latencies indicate that certain items are experiencing abnormally long latencies. Where the server processor 120 has access to sufficient information to determine the nature of the delay, the server processor 120 may also determine whether the server processor 120 has sufficient data and instructions to take remedial action without further human intervention. For instance, if the server 110 determines that the delay primarily results from the server response time and may result from a delayed transmission through intermediate nodes, the server 110 may reroute the connection to another one of its servers that is likely to avoid such nodes.

The system 100 may also accommodate a wide variety of alternatives and additions to the foregoing features. For instance, the system 100 may be used in connection with a variety of different network browsers. By way of example only, the network browser Chrome provides events that may also be used to determine or approximate the time at which a user requests a new web page and when a web page has finished loading. The network browser Chrome may also run one or more scripting languages, such as JavaScript.

Yet further, in one aspect, the network browser may include built-in functions similar to those described herein as being performed by the network browser plug-in. Moreover, one or more of the functions described above may be implemented by a combination of components in the system 100, such as by the server, the client devices 170-171, or in accordance with the routines of the network browser, network browser plug-in or web page. In other aspects, certain of the foregoing functions may be performed by the server 110 instead of the client device 170 or the client device 171, by the network browser instead of the network browser plug-in and by the network browser plug-in instead of the scripting language of the web page. In yet more aspects, certain functions may be performed by any one of the foregoing or by a variety of the foregoing in combination.

Indeed, as set forth elsewhere in this application, a protocol may be established that permits to servers access some of the functionality described above in a manner that is standard across many network browsers.

It should be understood that the following operations do not have to be performed in the precise order described above. Rather, various steps can be handled in reverse order or simultaneously.

It will be further understood that the sample values, types and configurations of data shown in the figures and described herein are for the purposes of illustration only. In that regard, systems and methods in accordance with the present disclosure may include different data values, types and configurations, and may be provided and received at different times (e.g., via different web pages) and by different entities (e.g., some values may be pre-suggested or provided from different sources).

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible aspects.

In addition, the systems, components, and logic described above may be implemented in many different ways, including a combination of hardware and software, or as software for installation on any desired operating system including Linux, UNIX, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media. The components, systems and logic may also be encoded in a signal, such as a signal received from a network or partitioned into sections and received in multiple packets communicated across a network.

The systems may be implemented in software, hardware, or a combination of software and hardware. The systems may be implemented in a computer programming language, such as C++, C#, Java, JavaScript, or any other computer programming language now known or later developed.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Moreover, one or more networks may be implemented as any combination of networks. A network may be a Wide Area Network ("WAN"), such as the Internet; a Local Area Network ("LAN"); a Personal Area Network ("PAN"), or a combination of WANs, LANs, and PANs. Moreover, a network may involve the use of one or more wired protocols, such as SOAP; wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Interfaces between the systems and the logic and modules within systems may be implemented in numerous ways. For example, interfaces between systems may be Web Services, SOAP, or Enterprise Service Bus interfaces. Other examples of interfaces include message passing, such as publish/subscribe messaging, shared memory, and remote procedure calls.

Although aspects of the disclosure herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the disclosure as defined by the appended claims. Furthermore, while certain operations and functions are shown in a specific order, they may be performed in a different order unless it is expressly stated otherwise.

The invention claimed is:

1. An apparatus for providing content to a network browser based on a reported latency comprising:

a memory operative to store an item of content for a web page; and a processor operative to:

receive a latency measurement from the web browser or a plug-in of the web browser, the latency measurement being based on an amount of time that has passed between two network browser events, whether or not the network browser was using more than one window to display information between the two events, and a type of action that resulted in the network browser transitioning its display between the two events; and modify data associated with the item of content for the web page with a different form of the data to account for the received latency measurement.

2. The apparatus of claim 1, wherein:

the item of content is of a first content type;

the memory is further operative to store a second item of content of a second content type; and the processor is operative to modify the item of content by replacing the item of content with the second item of content.

3. The apparatus of claim 1, wherein:

the item of content is of a first complexity;

the memory is further operative to store a second item of content of a second complexity that is less complex than the first complexity; and the processor is operative to modify the item of content by replacing the item of content with the second item of content.

4. The apparatus of claim 1, wherein the processor is operative to modify the item of content when the received latency measurement indicates a high latency.

5. The apparatus of claim 1, wherein the processor is further operative to confirm whether a decrease in the latency measurement has occurred based on a modification to the item of content for the web page.

6. A method for providing content to a network browser based on a reported latency comprising:

storing, in a memory, an item of content for a web page;

receiving a latency measurement from the web browser or a plug-in of the web browser, the latency measurement being based on an amount of time that has passed between two network browser events, whether or not the network browser was using more than one window to display information between the two events, and a type of action that resulted in the network browser transitioning its display between the two events; and modifying data associated with the item of content for the web page with a different form of the data to account for the received latency measurement.

7. The method of claim 6, wherein the item of content is of a first content type, and the method further comprises:

storing a second item of content of a second content type; and modifying the item of content by replacing the item of content with the second item of content.

8. The method of claim 6, wherein the item of content is of a first complexity, and the method further comprises:

storing a second item of content of a second complexity that is less complex than the first complexity; and modifying the item of content by replacing the item of content with the second item of content.

9. The method of claim 6, further comprising modifying the item of content when the received latency measurement indicates a high latency.

10. The method of claim 6, further comprising confirming whether a decrease in the latency measurement has occurred based on a modification to the item of content for the web page.

* * * * *